United States Patent
Quintero

(10) Patent No.: US 10,432,568 B2
(45) Date of Patent: Oct. 1, 2019

(54) AUTOMATED CLASSIFICATION AND TIME-BASED RELEVANCY PRIORITIZATION OF ELECTRONIC MAIL ITEMS

(71) Applicant: Microsoft Technology Licensing, LLC., Redmond, WA (US)

(72) Inventor: Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 15/235,561

(22) Filed: Aug. 12, 2016

(65) Prior Publication Data
US 2017/0289088 A1    Oct. 5, 2017

Related U.S. Application Data

(60) Provisional application No. 62/316,383, filed on Mar. 31, 2016.

(51) Int. Cl.
*H04L 12/58* (2006.01)
*G06Q 10/06* (2012.01)
*G06Q 10/10* (2012.01)

(52) U.S. Cl.
CPC .......... *H04L 51/26* (2013.01); *G06Q 10/06* (2013.01); *G06Q 10/107* (2013.01); *H04L 51/08* (2013.01); *H04L 51/12* (2013.01); *H04L 51/22* (2013.01)

(58) Field of Classification Search
CPC .......... H04L 51/26; H04L 51/22; H04L 51/12
See application file for complete search history.

(56) References Cited

U.S. PATENT DOCUMENTS

| 8,930,474 B2 * | 1/2015 | Sobhani | H04L 51/22 |
| | | | 709/206 |
| 9,438,549 B2 * | 9/2016 | Maresh | G06Q 10/107 |
| 2003/0167310 A1 | 9/2003 | Moody et al. | |
| 2003/0229668 A1 * | 12/2003 | Malik | G06Q 10/107 |
| | | | 709/206 |
| 2005/0114457 A1 | 5/2005 | Shih | |
| 2005/0132010 A1 | 6/2005 | Muller | |

(Continued)

FOREIGN PATENT DOCUMENTS

| GB | 2510265 A | 7/2014 |
| JP | 2013125528 A | 6/2013 |

OTHER PUBLICATIONS

"Automatically move or delete older items with AutoArchive", Retrieved on: Feb. 18, 2016 Available at: https://support.office.com/en-us/article/Automatically-move-or-delete-older-items-with-AutoArchive-e5046b1f-7aa3-4b7b-8828-d3c9bfd8d8f9.

(Continued)

*Primary Examiner* — Lashonda T Jacobs
(74) *Attorney, Agent, or Firm* — Merchant & Gould P.C.

(57) ABSTRACT

Automated classification and time-based relevancy prioritization of electronic messages is provided. An electronic mail item is parsed for identifying and extracting attributes for classifying the electronic message and for identifying time-sensitivity associated with the electronic message, and enriched with metadata identifying the classification and the associated time-sensitivity for displaying the electronic message based on the classification and based on relevancy to a receiving user based on the time-sensitivity.

20 Claims, 14 Drawing Sheets

(56) References Cited

U.S. PATENT DOCUMENTS

| | | | |
|---|---|---|---|
| 2005/0144246 A1* | 6/2005 | Malik | G06Q 10/107 709/206 |
| 2006/0053076 A1* | 3/2006 | Kremen | G06Q 30/02 705/51 |
| 2007/0011265 A1* | 1/2007 | Liezenberg | G06Q 10/107 709/217 |
| 2007/0156783 A1 | 7/2007 | Zbogar-Smith et al. | |
| 2007/0288575 A1* | 12/2007 | Gillum | G06Q 10/107 709/206 |
| 2008/0016575 A1* | 1/2008 | Vincent | H04L 51/14 726/26 |
| 2008/0091785 A1* | 4/2008 | Pulfer | G06Q 10/107 709/206 |
| 2008/0104052 A1 | 5/2008 | Ryan et al. | |
| 2009/0049134 A1* | 2/2009 | Kumhyr | G06Q 10/107 709/206 |
| 2009/0089378 A1* | 4/2009 | Maresh | G06Q 10/107 709/206 |
| 2010/0077052 A1 | 3/2010 | Alsop et al. | |
| 2010/0287249 A1* | 11/2010 | Yigang | G06Q 10/107 709/206 |
| 2011/0264685 A1 | 10/2011 | Cheng | |
| 2014/0115495 A1* | 4/2014 | Wetherell | G06Q 10/107 715/752 |
| 2015/0081821 A1 | 3/2015 | Sobhani | |
| 2015/0082192 A1 | 3/2015 | Tsuruta | |
| 2015/0372955 A1* | 12/2015 | Janakiraman | H04L 51/12 707/731 |

OTHER PUBLICATIONS

Poremsky, Diane, "Create a rule to delete mail after a number of days", Published on: Sep. 21, 2013 Available at: http://www.slipstick.com/outlook/rules/create-rule-to-expire-mail-after-a-number-of-days/.

Kumar, Arun, "How to Auto Delete Mail in Outlook Selectively", Published on: Mar. 7, 2012 Available at: http://www.thewindowsclub.com/auto-delete-mail-outlook.

Bort, Julie, "How to Automatically Delete Unwanted Email from Gmail", Published on: Jan. 11, 2014 Available at: http://www.businessinsider.in/How-To-Automatically-Delete-Unwanted-Email-From-Gmail/articleshow/28687178.cms.

"International Search Report and Written Opinion Issued in PCT Application No. PCT/US2017/024394", dated Jun. 21, 2017, 11 Pages.

* cited by examiner

AUTOMATED CLASSIFICATION AND TIME-BASED RELEVANCY PRIORITIZATION OF ELECTRONIC MAIL ITEMS

CROSS-REFERENCE TO RELATED APPLICATION

This application claims priority to U.S. Provisional Patent Application No. 62/316,383 titled "Automated Classification and Time-Based Relevancy Prioritization of Electronic Mail Items" filed Mar. 31, 2016, the disclosure of which is hereby incorporated by reference in its entirety.

BACKGROUND

Users of email applications typically receive a large number of emails daily, which can include various types of messages, such as work-related emails, personal emails, promotional emails, newsletters, and the like. Some emails comprise a time component (e.g., an expiration date, an date of an event or promotion, a due date), which, in effect, causes an email to be time-sensitive. An email that is time-sensitive can become irrelevant as the time component associated with the email passes. For example, the content of a time-sensitive email may expire or only be useful for a particular time period, may lose significant or relevancy after a certain time period, may require a response or action by a particular date/time, etc.

As can be appreciated, it can be time-consuming and inefficient to go through individual emails to determine what kind of messages they are, to determine if their contents are time-sensitive, and if so, to determine whether the contents are still relevant or active. Further, a user may miss out on time-sensitive emails that may require the user's attention.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter. Methods, systems and computer-readable media are provided for automating classification and time-based relevancy prioritization of electronic messages. In particular, aspects are directed to: parsing an electronic message for identifying and extracting attributes for classifying the electronic message and for identifying time-sensitivity associated with the electronic message; and annotating the electronic message with metadata identifying the classification and the associated time-sensitivity for displaying the electronic message based on the classification and based on relevancy to a receiving user based on the time-sensitivity.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
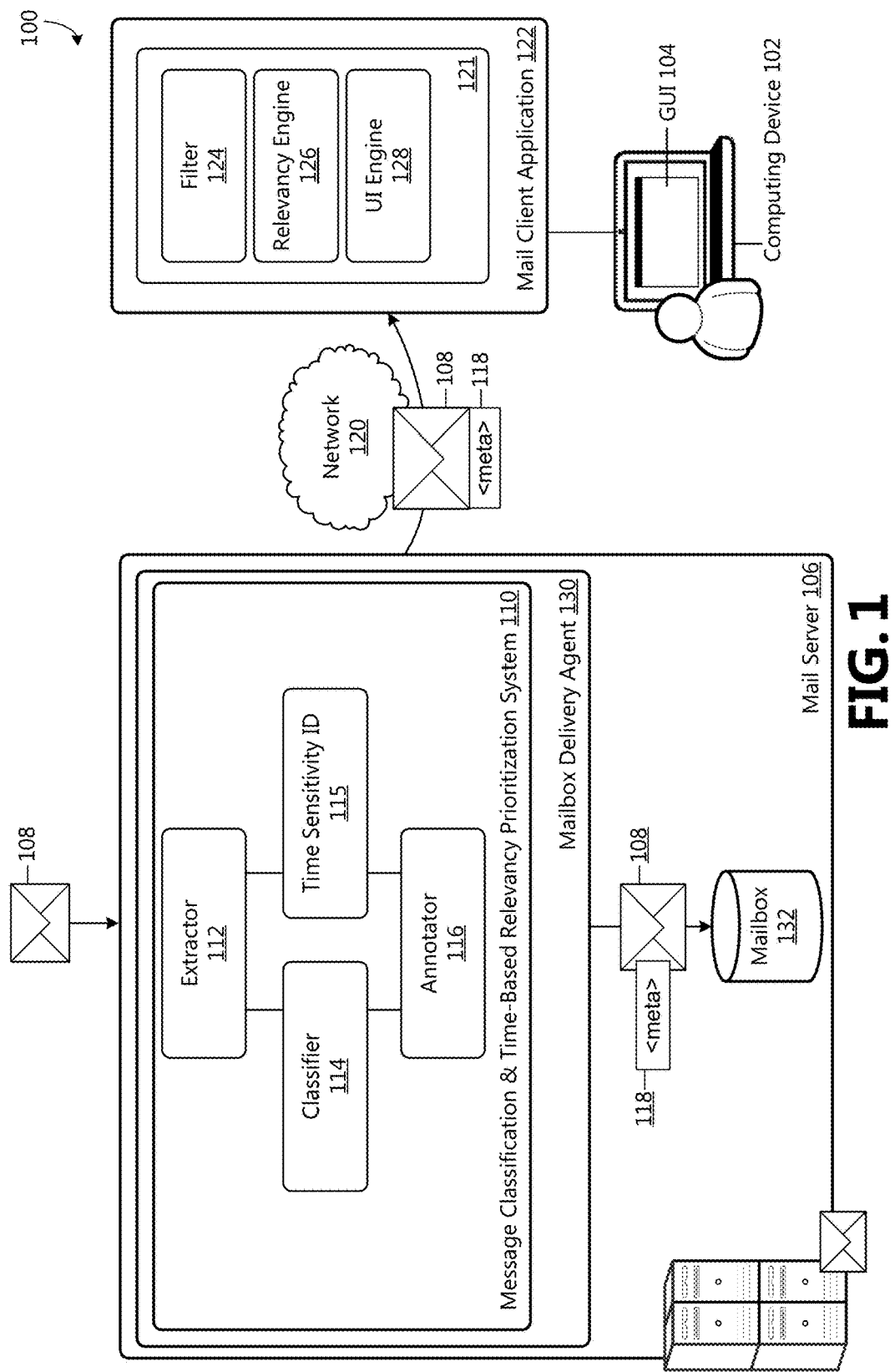
FIG. 1 is a block diagram of a representation of an environment in communication with a system for providing automated classification and time-based relevancy prioritization of electronic messages.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, device, and computer storage media for providing automated classification and time-based relevancy prioritization of electronic messages. Accordingly, aspects are directed to increasing computer performance by automatically differentiating between various types of electronic messages and enabling a display of electronic messages based on message categories, thus providing more efficient user interaction with electronic messages. In addition, computer efficiency for electronic mail item viewing and searching is improved by automatically determining a relevance of an electronic message to a user based on time-sensitivity, and enabling a display of electronic messages based on the determined relevancy. Accordingly, when searching for a particular message of interest, the number of messages a user has to navigate through to locate the particular message is reduced, and user interaction performance is increased.

With reference now to FIG. 1, a block diagram of one example environment 100 in communication with a message classification and time-based relevancy prioritization system 110,121 is shown. As illustrated, the example environment 100 includes a computing device 102. The computing device 102 illustrated in FIG. 1 is illustrated as a laptop computer; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 11, 12A, 12B, and 13.

A user may utilize an application on the computing device 102 for a variety of tasks, which may include, for example, to write, calculate, draw, take and organize notes, organize, prepare presentations, send and receive electronic mail, browse web content, make music, and the like. According to examples, the computing device 102 is operative to execute a mail client application 122. The user may utilize the mail client application 122 executing on the computing device 102 to receive, view, interact with, compose, or generate electronic messages 108, such as emails, meeting requests, or other types of electronic messages. According to an aspect, the mail client application 122 uses a standard protocol for receiving and sending electronic messages.

In some examples, the mail client application 122 is a thick client application, which is stored locally on the computing device 102. In other examples, the mail client application 122 is a thin client application (i.e., web application) that resides on a remote server and is accessible over a network 120, such as the Internet or an intranet. A thin mail client application 122 may be hosted in a browser-controlled environment or coded in a browser-supported language and reliant on a common web browser to render the application executable on the computing device 102. According to examples, a graphical user interface (GUI) 104 is provided by the mail client application 122 for enabling the user to interact with functionalities of the application and with electronic messages 108 through manipulation of graphical icons, visual indicators, and the like.

According to an aspect, a mail server 106 is operative to receive incoming electronic messages 108 from a sending user, and forward outgoing electronic messages 108 for delivery to a recipient user. In some examples, the mail server 106 is operative to transmit an electronic message 108 to one or more intended recipients by routing the electronic message 108 to one or more mailbox delivery agents 130. The mail server 106 includes or is communicatively attached to a plurality of mailbox delivery agents 130, wherein each mailbox delivery agent 130 is connected to a user's mailbox 132 from which the mail client application 122 is operative to retrieve an electronic message 108, for example, over a network 120.

In one example and as illustrated in FIG. 1, the mailbox delivery agent 130 comprises a server-side message classification and time-based relevancy prioritization system 110, wherein server-side automated classification and time-based relevancy prioritization functionalities of electronic messages 108 are performed when an electronic message 108 is received by a mailbox delivery agent 130 associated with an intended recipient. However, server-side automated classification and time-based relevancy prioritization functionalities are not limited to implementation by the mailbox delivery agent 130. In another example (not illustrated), the server-side message classification and time-based relevancy prioritization system 110 is not included in the mailbox delivery agent 130, and server-side automated classification and time-based relevancy prioritization functionalities of electronic messages 108 are performed prior to routing an electronic message 108 to the one or more mailbox delivery agents 130 associated with the one or more intended recipients, and may be implemented by various distributed components within the environment 100.

Content in an electronic message 108 may comprise one or more objects present or embedded in the electronic message 108 including, but not limited to: text (including text containers), numeric data, macros, images, movies, sound files, and metadata. According to an example, an electronic message 108 includes one or more objects that provide an indication of a message category to which the electronic message 108 is related. For example, various components of the electronic message 108 may include text, links, numeric data, dates, etc., that can be extracted and utilized to classify the electronic message 108 to a message category, such as a newsletter, a promotional message, a travel-related message, an event-related message, a bill, a notification, an invitation, etc.

According to another example, the electronic message 108 includes one or more objects related to time-related data that provides an indication that the electronic message 108 or content of the electronic message 108 is time-sensitive. For example, the electronic message 108 may be a promotional message that includes a promotion that is relevant for a particular time period. The promotional message may include an expiration date or time period indicating effective dates of the promotion. As another example, the electronic message 108 may be one of: a regularly-distributed informational publication (e.g., a newsletter, daily/weekly/monthly announcement), a travel-related message (e.g., comprising an itinerary, boarding passes, reservation information, meeting information), an event-related message (e.g., comprising event information, concert tickets, save-the-date information), a notification (e.g., delivery notification, payment notification), a financial-related message (e.g., a bill, a bank statement), and the like that includes content that may lose significance or relevancy after a certain time period. As another example, the electronic message 108 may be a call-to-action message that requests a response or action from the user by a particular date/time.

As illustrated in FIG. 1, the mail client application 122 includes a client-side message classification and time-based relevancy prioritization system 121 operative to perform various client-side automated classification and time-based relevancy prioritization functionalities of electronic messages 108. According to examples, the client-side message classification and time-based relevancy prioritization system 121 includes a filter 124, a relevancy engine 126, and a user interface (UI) engine 128, which are described in detail below with respect to FIGS. 6-9. The server-side message classification and time-based relevancy prioritization system 110 includes: an extractor 112, a classifier 114, a time-sensitivity identifier 115, and an annotator 116. The extractor 112 is illustrative of a software module, system, or device operative to analyze an electronic message 108, and extract one or more objects that can be utilized to classify the electronic message 108 to a message category or provide an indication of time-sensitivity associated with the electronic message 108. Components 114, 115, and 116 are described in detail below with respect to FIGS. 3-5.

Figure 2:
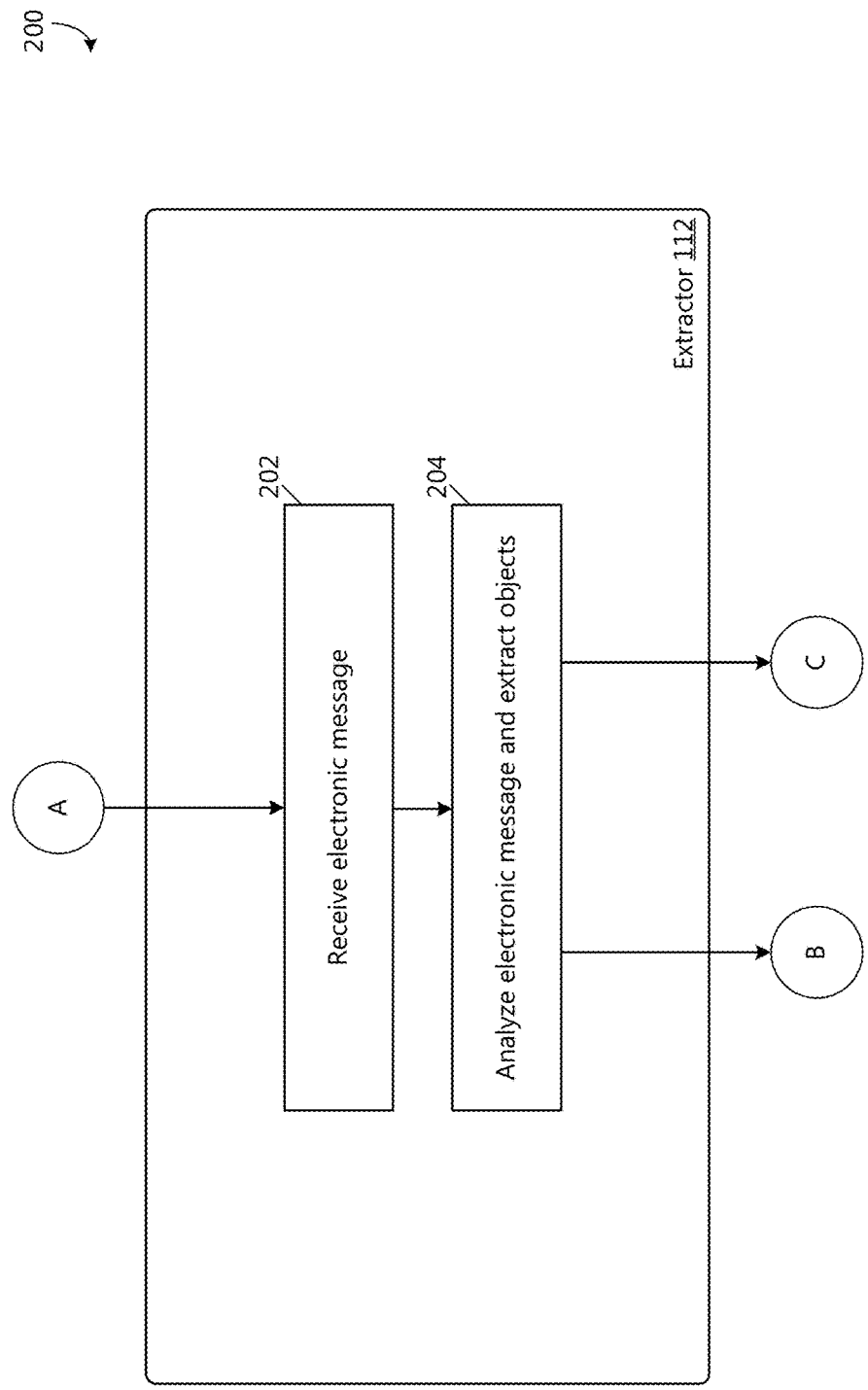
FIG. 2 is a flow chart showing general stages involved in an example method for analyzing an electronic message and extracting attributes for classifying the electronic message and for identifying a time-sensitivity associated with the electronic message.

With reference now to FIG. 2, a flow chart showing general stages involved in an example method 200 performed by the extractor 112 is illustrated. The method 200 begins at OPERATION 202, where an electronic message 108 is received. For example, when a sending user selectively sends the electronic message 108 to a recipient, the mail server 106 associated with the recipient's mailbox 132 to which the electronic message 108 is addressed receives the incoming electronic message 108, and passes the electronic message 108 to the extractor 112.

The method 200 proceeds to OPERATION 204, where the extractor 112 analyzes various components of the electronic message 108, and extracts one or more objects from one or more components of the electronic message 108. For example, the extractor 112 is operative to parse at least one of: a subject header, a sender header, a date/time header, a recipient header, a message body, a HyperText Markup Language (HTML) body, and an attachment for objects, such as text, numeric data, dates, links, etc., that are related to a message category or time-sensitivity. For example, the extractor 112 is operative to isolate objects comprising a time component. In one example, determination of relatedness to a message category or time-sensitivity is based on natural language processing and machine learning queued off of dates, word patterns (e.g., "expires," "good until," "RSVP by," "newsletter," "itinerary," "delivered," "statement," "boarding pass," "save the date"), numeric patterns, and the like.

In various aspects, the data comprising the electronic message 108 content are stored in an elemental form by the electronic message 108, such as in Extensible Markup Language (XML), Java Script Object Notation (JSON) elements, HTML, or another declaratory language interpretable by a schema. The schema may define sections or content items via tags, and may apply various properties to content items via direct assignment or hierarchical inheritance. For example, an object comprising text may have its typeface defined in its element definition (e.g., "<text typeface=garamond>example text</text>") or defined by a stylesheet or an element above the object in the document's hierarchy from which the element depends. As another example, an electronic message 108 may have a JSON property that outlines a date associated with an object in the message (e.g., an expiration date of a coupon), which can then be queried by the client.

Figure 3:
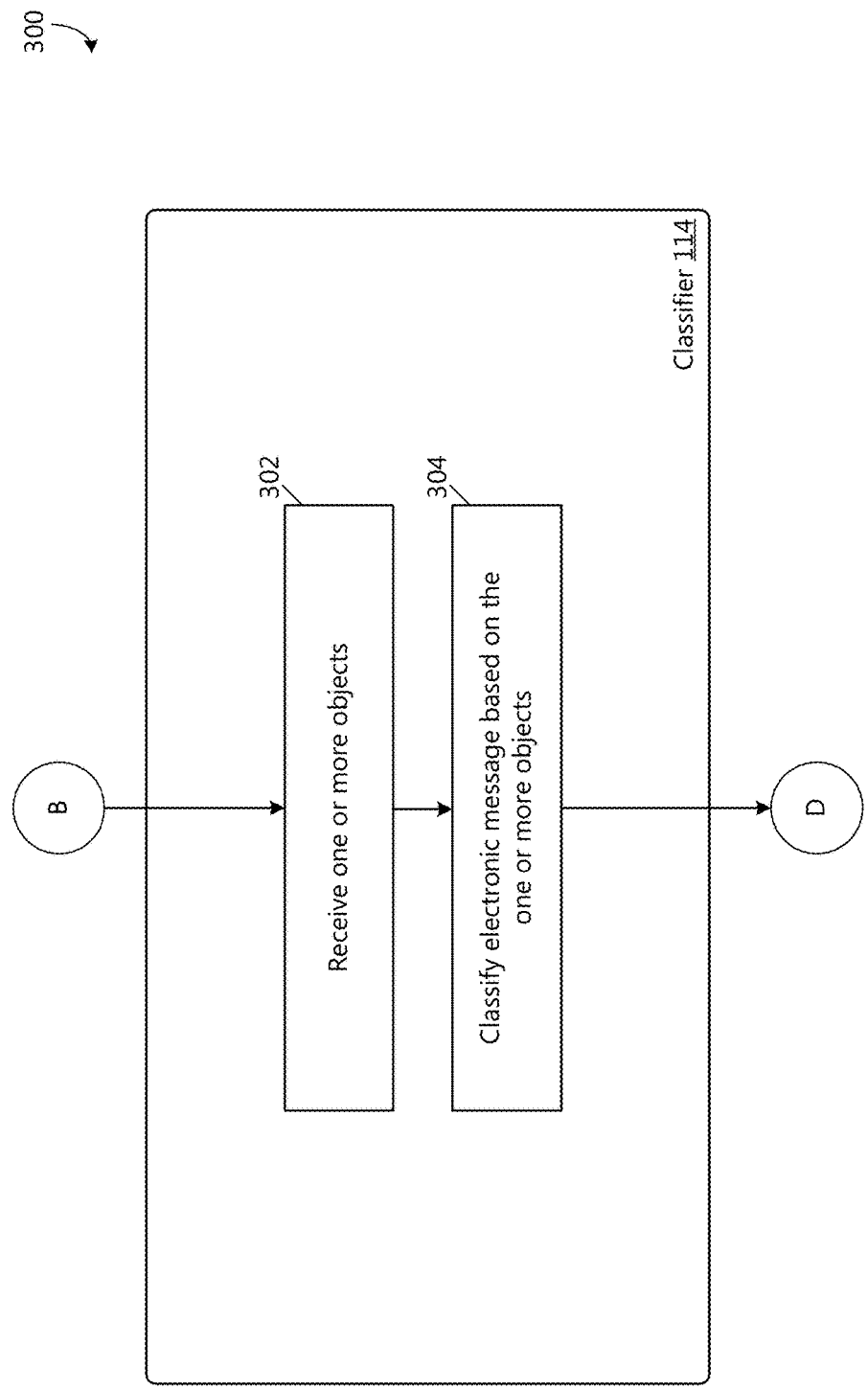
FIG. 3 is a flow chart showing general stages involved in an example method for classifying an electronic message.

The classifier 114 (shown in FIG. 1) is illustrative of a software module, system, or device operative to classify an electronic message 108 to a message category. With reference now to FIG. 3, a flow chart showing general stages involved in an example method 300 performed by the classifier 114 is illustrated. The method 300 is a continuance of method 200 of FIG. 2, wherein at OPERATION 302, the classifier 114 receives one or more objects extracted by the extractor 112 (at OPERATION 204). The method 300 proceeds to OPERATION 304, where the classifier 114 determines a message category related to the electronic message 108 based on natural language processing of the one or more objects. For example, the classifier 114 may determine that the electronic message 108 is a newsletter, an announcement, a travel-related message, an event-related message, a delivery notification, a payment notification, a bill, a financial statement, a call-to-action message, etc.

Figure 4:
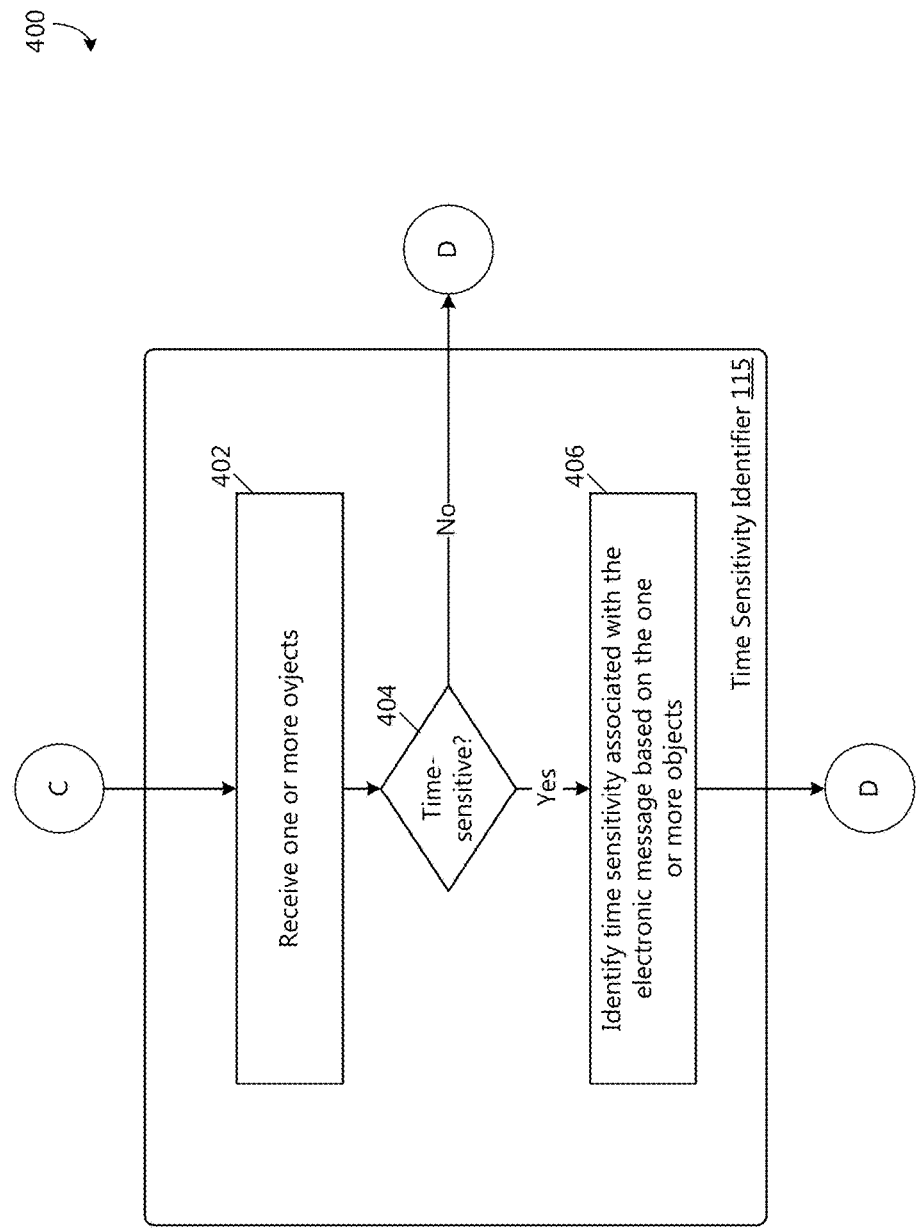
FIG. 4 is a flow chart showing general stages involved in an example method for identifying time-sensitivity associated with an electronic message.

The time-sensitivity identifier 115 (shown in FIG. 1) is illustrative of a software module, system, or device operative to identify time-sensitivity associated with an electronic message 108. With reference now to FIG. 4, a flow chart showing general stages involved in an example method 400 performed by the time-sensitivity identifier 115 is illustrated. The method 400 is a continuance of method 200 of FIG. 2, wherein at OPERATION 402, the time-sensitivity identifier 115 receives one or more objects extracted by the extractor 112 (at OPERATION 204). The method 400 proceeds to DECISION OPERATION 404, where the time-sensitivity identifier 115 makes a determination as to whether the electronic message 108 is time-sensitive based natural language processing of the one or more objects, for example, based on extracted dates and surrounding textual data, numeric data, etc., consistent with time-related word patterns, numeric patterns, dates, etc.

When a determination is made that the electronic message 108 is time-sensitive, the method 400 continues to OPERATION 406, where the time-sensitivity associated with the electronic message 108 is identified. For example, the time-sensitivity identifier 115 may identify that a newsletter (i.e., electronic message 108) includes date information consistent with a publication date, such as "January 2000." As another example, the time-sensitivity identifier 115 may identify that a promotional message (i.e., electronic message 108) includes date information and textual data consistent with an expiration date. As another example, the time-sensitivity identifier 115 may identify that a promotional electronic message 108 includes a date of an event, wherein after the date of the event has passed, the electronic message is no longer relevant to the user.

Figure 5:
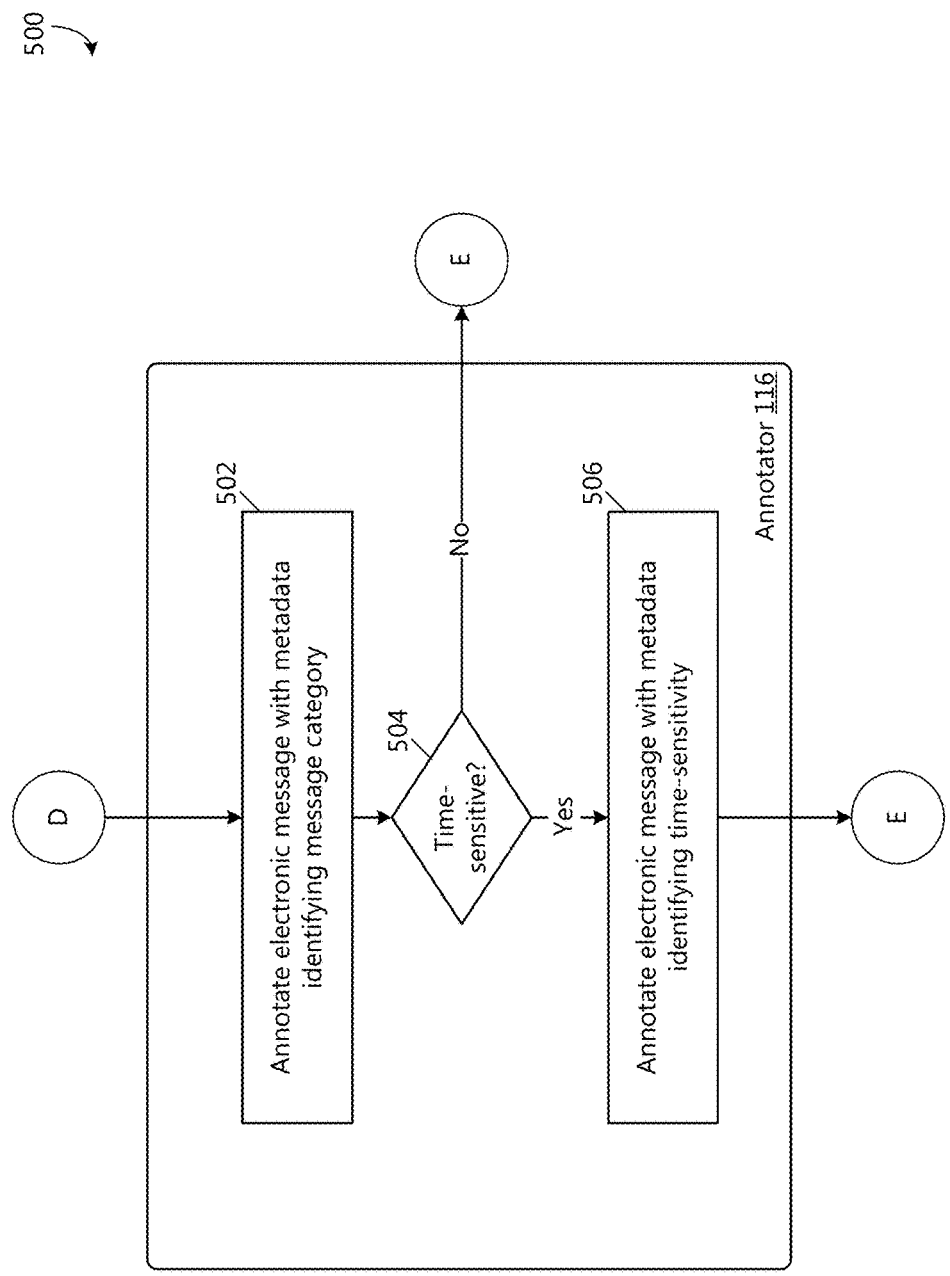
FIG. 5 is a flow chart showing general stages involved in an example method for annotating an electronic message with classification metadata and time-sensitivity metadata.

The annotator 116 (shown in FIG. 1) is illustrative of a software module, system, or device operative to annotate an electronic message 108 with classification metadata 118 and time-sensitivity metadata 118. With reference now to FIG. 5, a flow chart showing general stages involved in an example method 500 performed by the annotator 116 is illustrated. The method 500 is a continuance of method 300 of FIG. 3 (from OPERATION 304) and method 400 of FIG. 4 (from DECISION OPERATION 404 or from OPERATION 406), wherein at OPERATION 502, the annotator 116 annotates the electronic message 108 with metadata 118 defining the message category determined by the classifier 114 at OPERATION 304. The method 500 continues to DECISION OPERATION 504, where a determination is made as to whether the electronic message 108 is time-sensitive. For example, the determination is made based on whether time-sensitivity associated with the electronic message 108 is identified by the time-sensitivity identifier 115 at OPERATION 406 (in FIG. 4) and passed to the annotator 116. If a determination is made that the electronic message 108 is time-sensitive, the method 500 proceeds to OPERATION 506, where the annotator 116 annotates the electronic message 108 with metadata 118 defining the time-sensitivity identified by the time-sensitivity identifier 115 at OPERATION 406.

Figure 6:
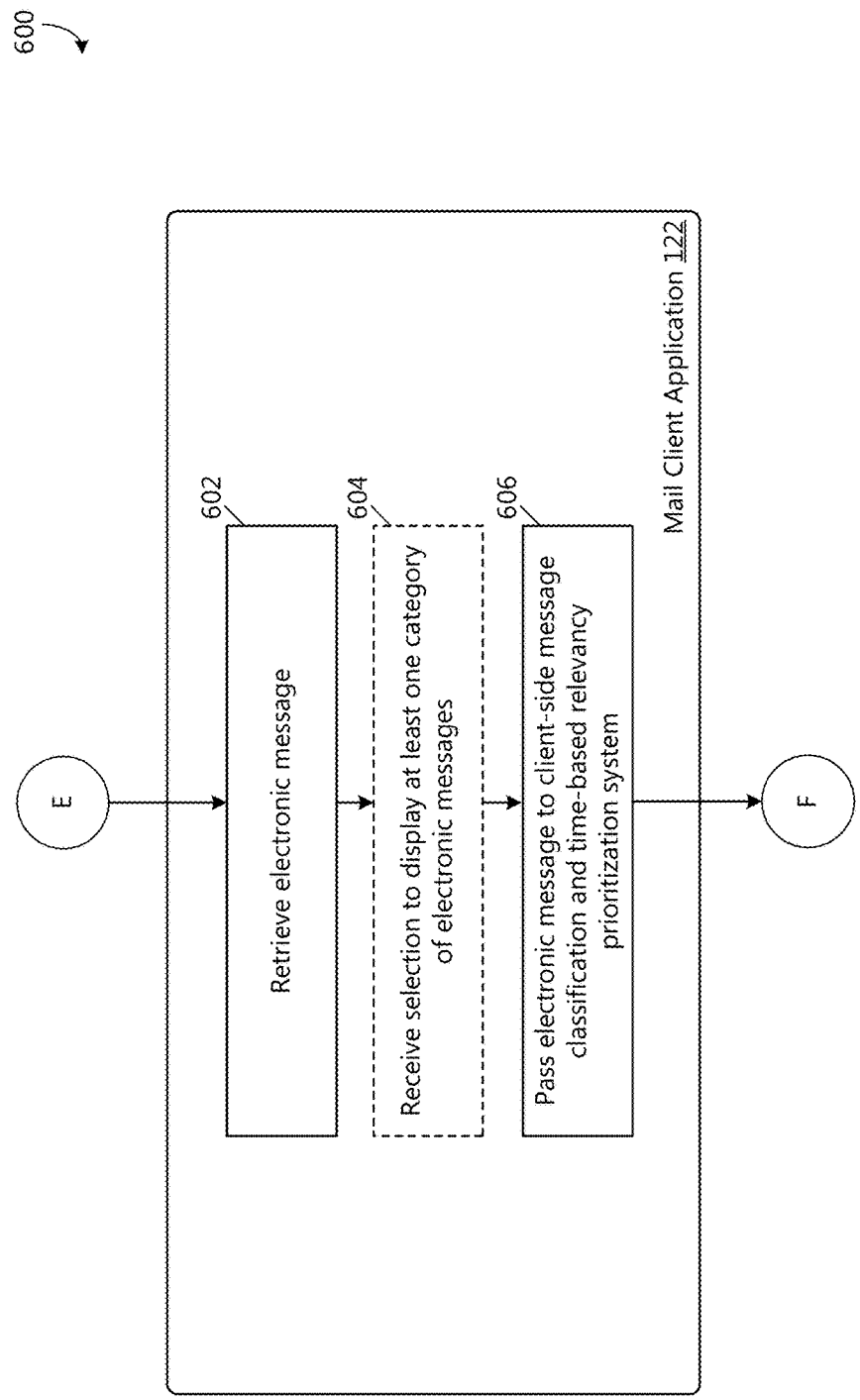
FIG. 6 is a flow chart showing general stages involved in an example method for retrieving an electronic message by a mail client application.

With reference now to FIG. 6, a flow chart showing general stages involved in an example method 600 performed by the mail client application 122 (shown in FIG. 1) is illustrated. The method 600 is a continuance of method 500 of FIG. 5 (from DECISION OPERATION 504 or from OPERATION 506), wherein at OPERATION 602, the mail client application 122 retrieves the electronic message 108 from the mailbox 132. In some examples, the electronic message 108 is pushed to the mail client application 122, wherein the electronic message 108 is received by the mail client application 122. The method 600 optionally proceeds to OPERATION 604, where the mail client application 122 receives a selection to display at least one message category. For example, a user of the mail client application 122 may select to view electronic messages classified to a specific message category, such as to a newsletters message category. The method 600 proceeds to OPERATION 606, where the mail client application 122 directs the electronic message 108 to the client-side message classification and time-based relevancy prioritization system 121.

Figure 7:
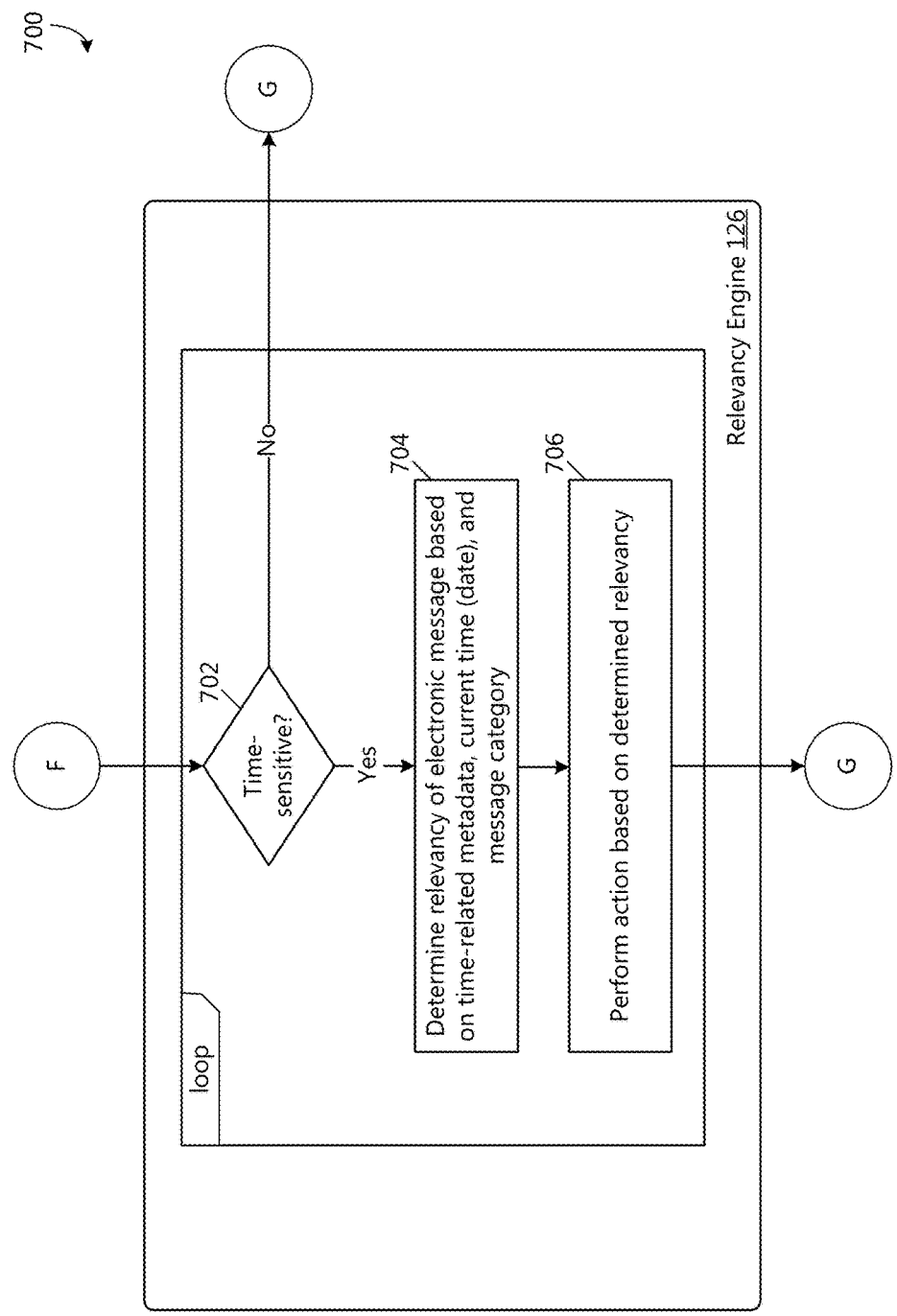
FIG. 7 is a flow chart showing general stages involved in an example method for performing an action based on a determined relevancy of an electronic message.

The relevancy engine 126 (shown in FIG. 1) is illustrative of a software module, system, or device operative to perform an action based on a determined relevancy of an electronic message 108. With reference now to FIG. 7, a flow chart showing general stages involved in an example method 700 performed by the relevancy engine 126 is illustrated. The method 700 is a continuance of method 600 of FIG. 6 and runs in a loop, wherein at DECISION OPERATION 702, the relevancy engine 126 makes a determination as to whether the electronic message 108 is time-sensitive. For example, the relevancy engine 126 makes the determination based on the metadata 118 added to the electronic message 108 by the annotator 116.

If a determination is made that the electronic message is time-sensitive, the method 700 proceeds to OPERATION 704, where the relevancy engine 126 determines a relevancy of the electronic message 108 to the user based on the time-related metadata 118 defining the time-sensitivity determined by the time-sensitivity identifier 115, based on a current date or time, and based on the message category to which the electronic message is classified according to the classification metadata. For example, the relevancy engine 126 is operative to identify that an example electronic message 108 is classified as a travel-related message, and includes time-related information, such as a boarding pass. The relevancy engine 126 is further operative to determine whether the time-related metadata is associated with a date occurring prior to or after the current date. In some examples, the relevancy engine 126 determines an amount of time between the time-related data in the electronic message 108 and the current date. Accordingly, the relevancy engine 126 determines whether the electronic message 108 is likely to be relevant or irrelevant to the user based on the identified information (i.e., the time-related metadata, the time difference between the current date and the time-related metadata, and the message category). For example, the category that an electronic message 108 is classified as determines whether the time difference between the time-related metadata and the current date (e.g., time-related metadata occurring prior to or after or the amount of time difference) causes the electronic message to be determined to be relevant or irrelevant.

According to one example, a travel-related, event-related, or financial-related electronic message 108 may be determined to be relevant when the time-related metadata is associated with a date occurring on or after the current date, and may be determined to be irrelevant when the time-related metadata is associated with a date occurring prior to the current date. In some examples, the electronic message 108 may be determined to be irrelevant when the time-related metadata is associated with a date that occurs prior to the current date by more than a predetermined amount of time (e.g., 1 week, 1 month, 6 months). According to another example, a regularly-distributed informational publication or a notification-categorized electronic message 108 may be determined to be relevant when the time-related metadata is associated with a date occurring within a predetermined amount of time from the current date (e.g., 1 week, 2 weeks, 1 month). According to another example, a call-to-action electronic message 108 may be determined to be relevant when the time-related metadata is associated with a date occurring on or after the current date, and may be determined to be irrelevant when the time-related metadata is associated with a date occurring prior to the current date. As should be appreciated, the above relevance and irrelevance determinations are meant as non-limiting examples, and other determinations of relevance and irrelevance are within scope of the present disclosure. According to an aspect, the determination of relevance and irrelevance are based on settings or user-preferences.

For example, if the date associated with the boarding pass (i.e., travel-related message category) is determined to have occurred prior to the current date, the relevancy engine 126 is operative to determine that the electronic message 108 is likely to be irrelevant to the user. As another example, if the date associated with a coupon or promotion is determined to have passed, the relevancy engine 126 is operative to determine that the electronic message 108 is likely to be irrelevant to the user. As another example, if a date associated with a newsletter is determined to be prior to the current date but within a predetermined amount of time of the current date, such as within one month of the current date, the relevancy engine 126 is operative to determine that the electronic message 108 is likely to be relevant to the user. As another example, if a category of an electronic message is determined to be an event-related message, and time-related data in the electronic message 108 is determined to be prior to the current date, the relevancy engine 126 is operative to determine that the electronic message is likely to be irrelevant to the user.

Responsive to the determined relevance of the electronic message 108, at OPERATION 706, the relevancy engine 126 is operative to perform an action based on the relevance. For example, continuing with the example above, upon determining that the electronic message 108 is likely to be irrelevant to the user, the relevancy engine 126 may archive the electronic message 108, delete the electronic message 108, filter the electronic message from view, provide a visual indication (e.g., highlight the message) in the user interface, add metadata to the electronic message 108 indicating the determined relevance, etc. According to an aspect, the action performed by the relevancy engine 126 may be based on settings or user-selected preferences. In one example, if the relevancy engine 126 determines that a date associated with an electronic message 108 is an upcoming date occurring within a predetermined amount of time from the current date (e.g., tomorrow, next week), the relevancy engine 126 is operative to prioritize the electronic message 108. In some examples, the relevancy engine 126 is further operative to perform an action based on the priority, such as integrate with a calendaring application for adding a notification or a calendaring event to the user's calendar associated with the time-sensitive electronic message 108.

Figure 8:
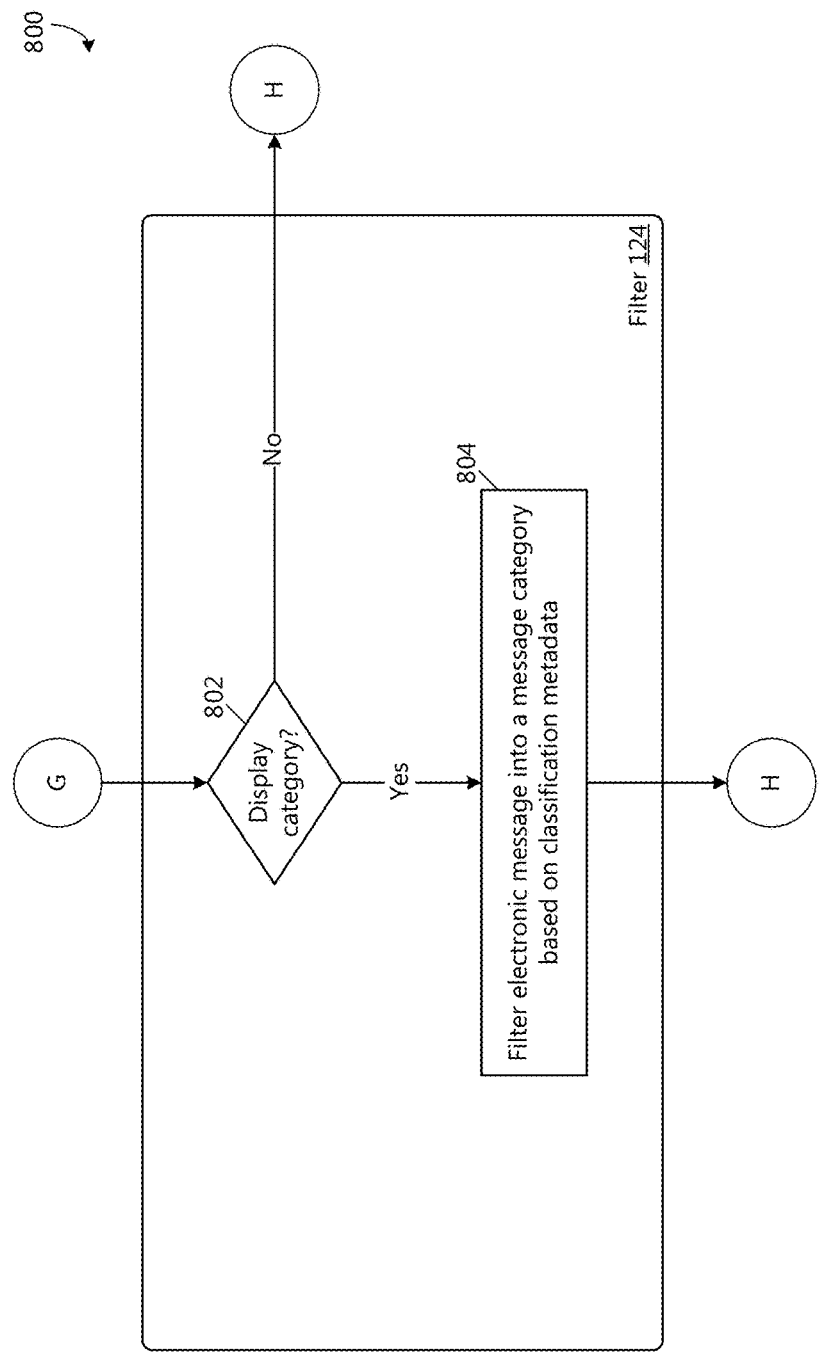
FIG. 8 is a flow chart showing general stages involved in an example method for filtering an electronic message into at least one category.

The filter 124 (shown in FIG. 1) is illustrative of a software module, system, or device operative to filter an electronic message into a message category based on classification metadata 118. With reference now to FIG. 8, a flow chart showing general stages involved in an example method 800 performed by the filter 124 is illustrated. The method 800 is a continuance of method 700 of FIG. 7 (from DECISION OPERATION 702 or from OPERATION 706), wherein at DECISION OPERATION 802, the filter 124 makes a determination as to whether an indication of a selection to display messages in a particular message category is received. When the filter 124 makes a determination that a selection to display a message category is received, the method 800 proceeds to OPERATION 804, where the filter 124 filters one or more electronic messages 108 into the selected message category based on the classification metadata 118.

Figure 9:
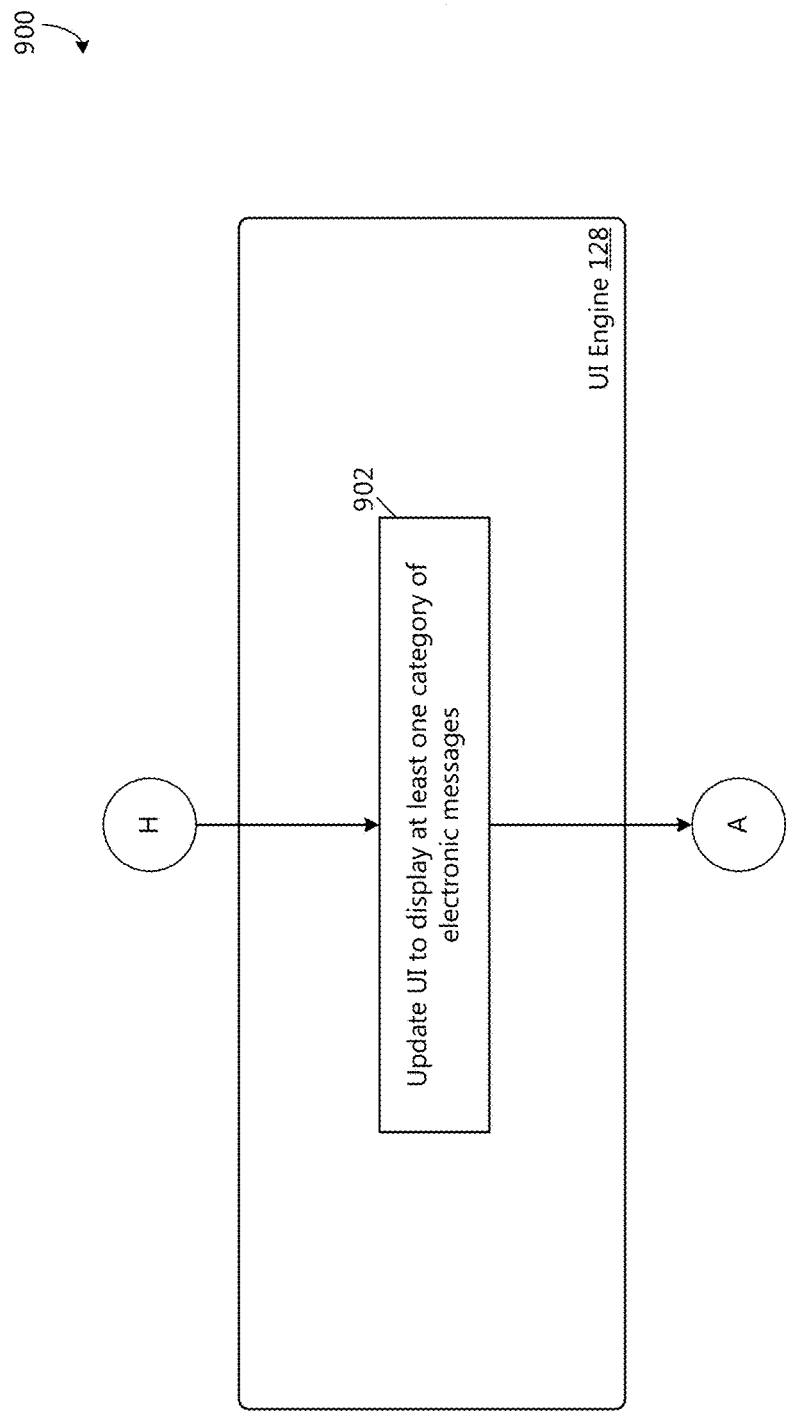
FIG. 9 is a flow chart showing general stages involved in an example method for updating a graphical user interface to display at least one category of electronic messages.

The UI engine 128 (shown in FIG. 1) is illustrative of a software module, system, or device operative to generate a GUI display of one or more message categories, and generate a display of one or more electronic messages 108 classified to a selected message category. With reference now to FIG. 9, a flow chart showing general stages involved in an example method 900 performed by the UI engine 128 is illustrated. The method 900 is a continuance of method 800 of FIG. 8 (from DECISION OPERATION 802 or from OPERATION 804), wherein at DECISION OPERATION 902, the UI engine 128 updates the GUI 104 to display the selected message category and one or more electronic messages 108 classified to the selected message category. In some examples, the UI engine 128 is further operative to update the GUI 104 to display an indication of a priority of an electronic message 108 based on a determined priority by the relevancy engine 126. For example, the UI engine 128 may highlight a prioritized electronic message 108 or apply another visual indication of priority.

In some examples, the UI engine 128 is operative to display a relevancy filter selector, enabling the user to filter electronic messages 108 according to relevance. For example, the user is enabled to view only electronic messages 108 that are determined to be relevant to him/her. As another example, the user is enabled to view only electronic messages 108 that are determined to be irrelevant to him/her, such as time-sensitive electronic messages 108 comprising time-related metadata associated with a date occurring prior to the current date. As another example, the user is enabled to view all messages classified to a message category including electronic messages 108 that are determined to be relevant to the user and electronic messages 108 that are determined to be irrelevant to the user.

Figure 10:
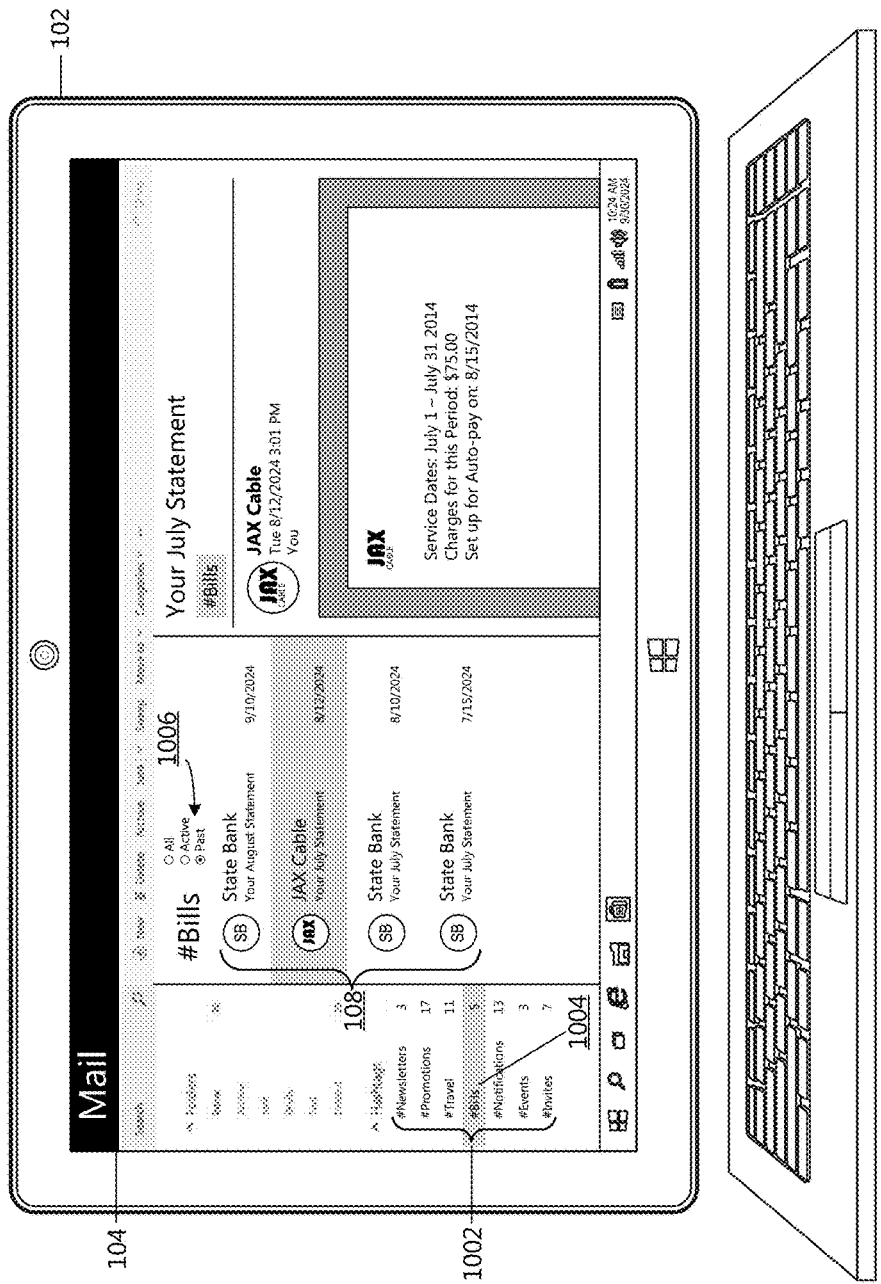
FIG. 10 is an illustration of an example graphical user interface displaying a category of electronic messages.

With reference now to FIG. 10, an example GUI 104 displayed on a computing device 102 including a display of a plurality of message categories 1002 and a display of a plurality of electronic messages 108 automatically classified to a selected message category 1004. The example GUI 104 includes a display of a relevancy filter selector 1006. For example and as illustrated, via the relevancy filter selector 1006, the user has selected to filter electronic messages 108 within the selected "Bills" category 1004 to display irrelevant messages, which, in this example, are past bills. Accordingly, the UI engine 128 updates the GUI 104 to display the electronic messages 108 that are determined to be irrelevant to the user (e.g., past bills). As will be appreciated, the example illustrated in FIG. 10 is a non-limiting illustration; other GUIs with different elements and arrangements thereof may be used in conjunction with the present disclosure.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
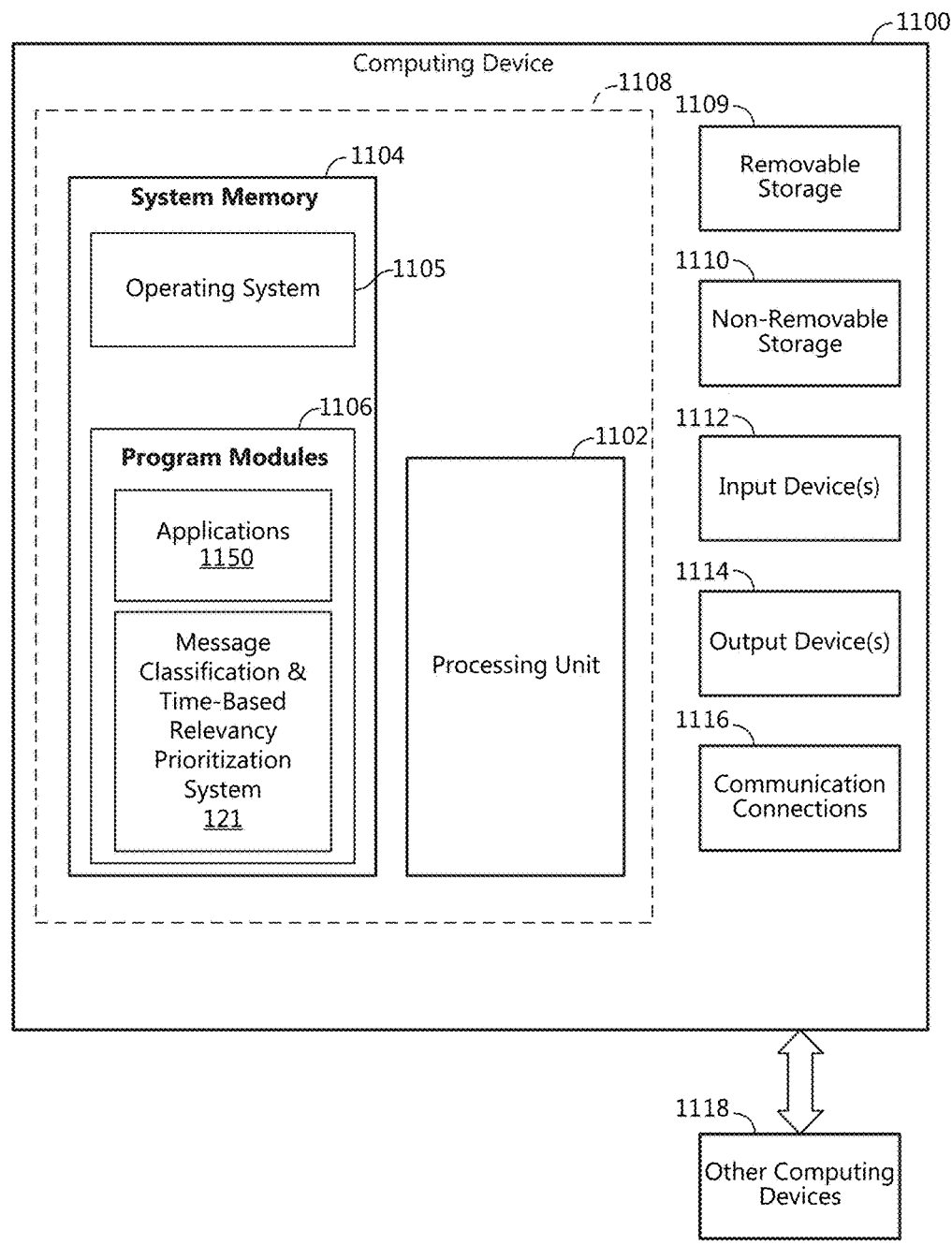
FIG. 11 is a block diagram illustrating example physical components of a computing device.
Figure 12A:
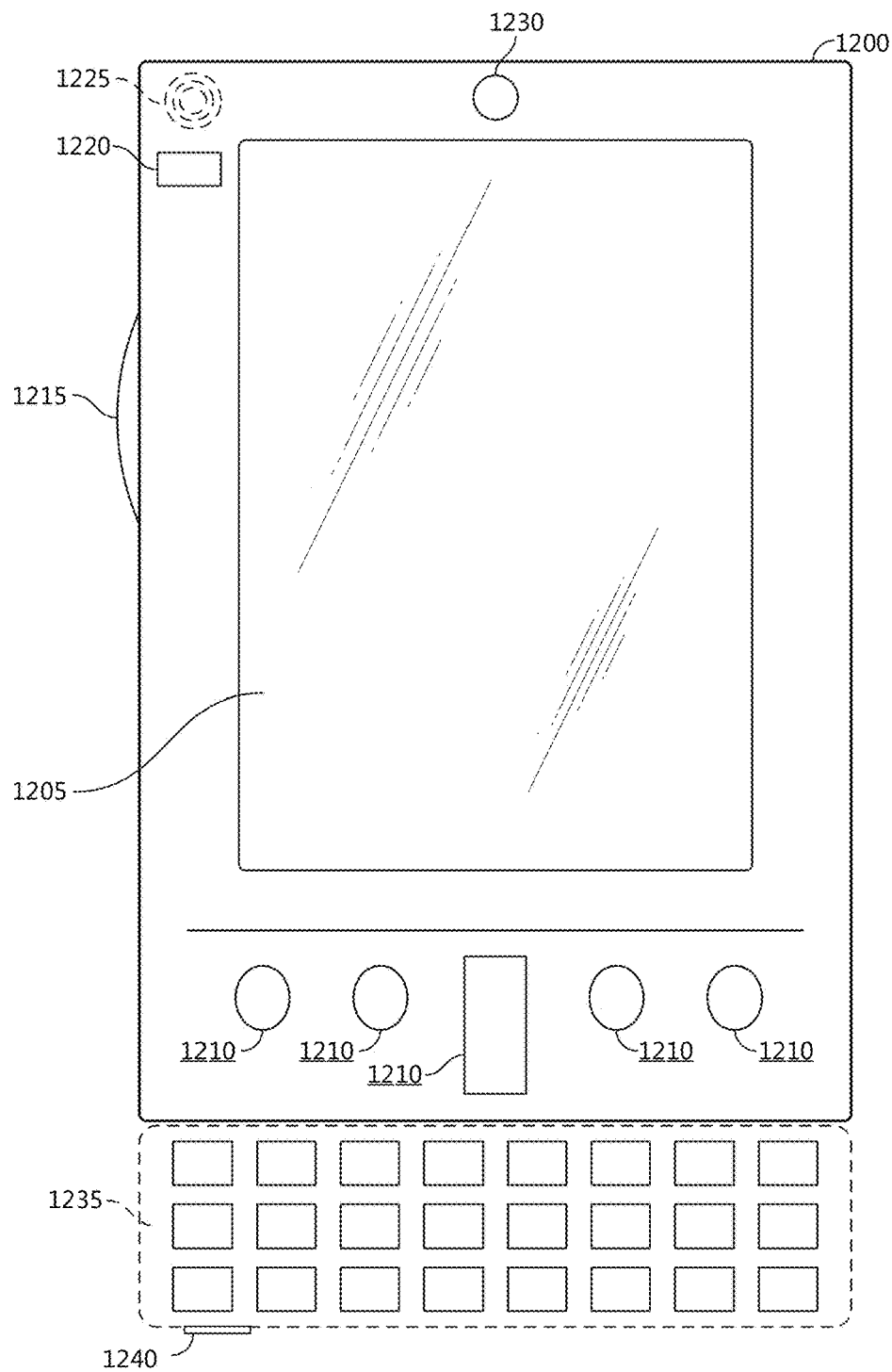
FIGS. 12A and 12B are block diagrams of a mobile computing device.
Figure 12B:
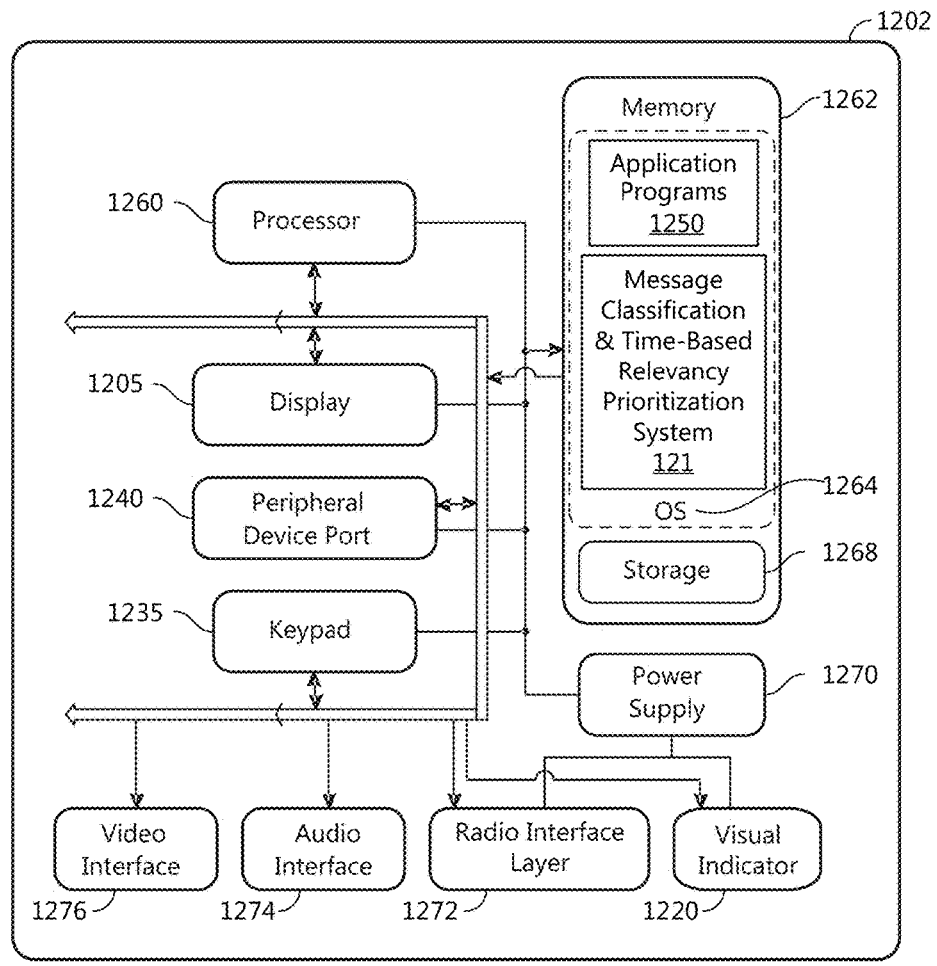
Figure 13:
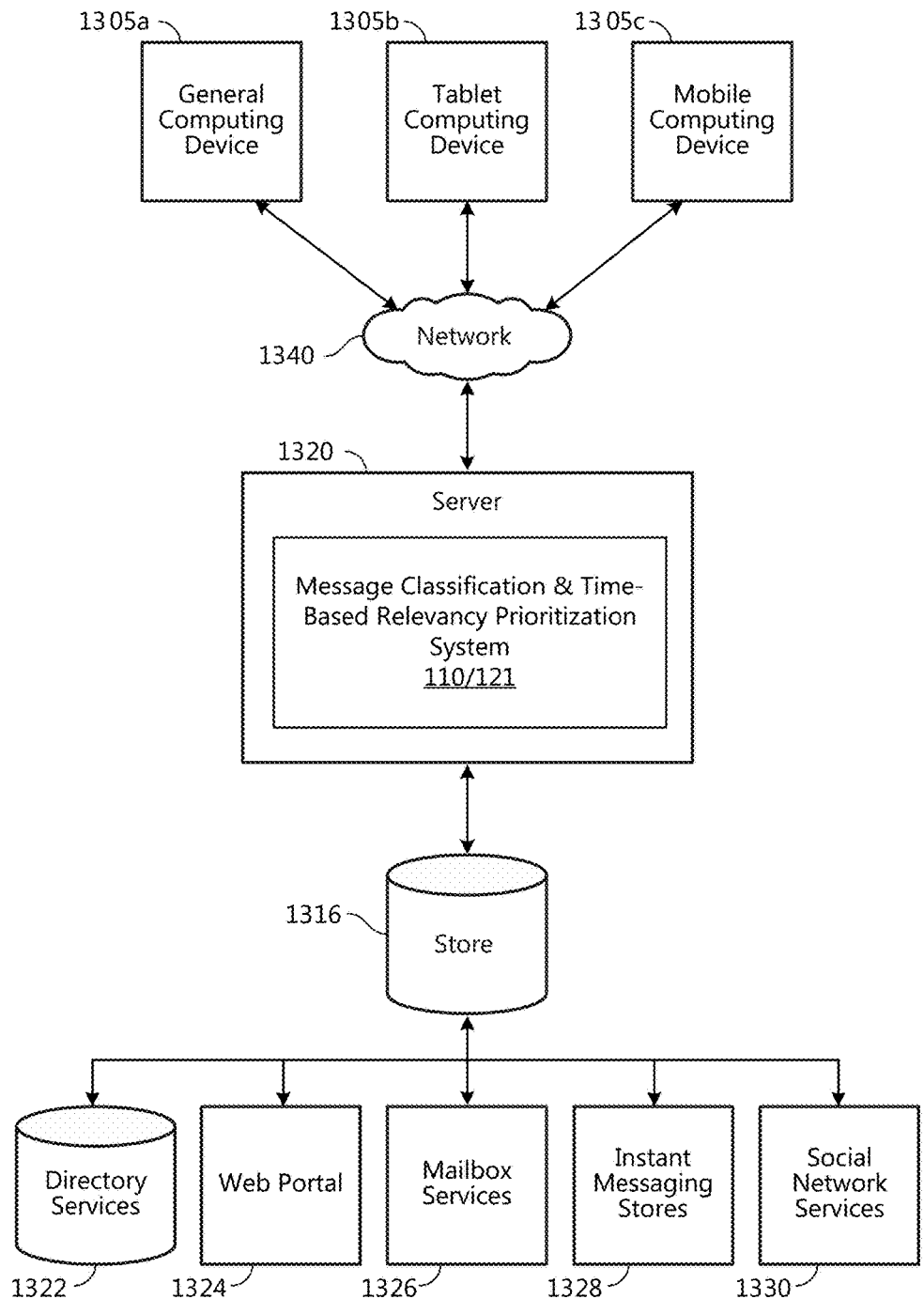
FIG. 13 is a block diagram of a distributed computing system.

FIGS. 11-13 and the associated descriptions provide a discussion of a variety of operating environments in which examples are practiced. However, the devices and systems illustrated and discussed with respect to FIGS. 11-13 are for purposes of example and illustration and are not limiting of a vast number of computing device configurations that are utilized for practicing aspects, described herein.

FIG. 11 is a block diagram illustrating physical components (i.e., hardware) of a computing device 1100 with which examples of the present disclosure are be practiced. In a basic configuration, the computing device 1100 includes at least one processing unit 1102 and a system memory 1104. According to an aspect, depending on the configuration and type of computing device, the system memory 1104 comprises, but is not limited to, volatile storage (e.g., random access memory), non-volatile storage (e.g., read-only memory), flash memory, or any combination of such memories. According to an aspect, the system memory 1104 includes an operating system 1105 and one or more program modules 1106 suitable for running software applications 1150. According to an aspect, the system memory 1104 includes the Message Classification and Time-Based Relevancy Prioritization System 121. The operating system 1105, for example, is suitable for controlling the operation of the computing device 1100. Furthermore, aspects are practiced in conjunction with a graphics library, other operating systems, or any other application program, and is not limited to any particular application or system. This basic configuration is illustrated in FIG. 11 by those components within a dashed line 1108. According to an aspect, the computing device 1100 has additional features or functionality. For example, according to an aspect, the computing device 1100 includes additional data storage devices (removable and/or non-removable) such as, for example, magnetic disks, optical disks, or tape. Such additional storage is illustrated in FIG. 11 by a removable storage device 1109 and a non-removable storage device 1110.

As stated above, according to an aspect, a number of program modules and data files are stored in the system memory 1104. While executing on the processing unit 1102, the program modules 1106 (e.g., message classification and time-based relevancy prioritization system 110,121) perform processes including, but not limited to, one or more of the stages of the methods 200,300,400,500,600,700,800,900 illustrated in FIGS. 2-9. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 11 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1100 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1100 has one or more input device(s) 1112 such as a keyboard, a mouse, a pen, a sound input device, a touch input device, etc. The output device(s) 1114 such as a display, speakers, a printer, etc. are also included according to an aspect. The aforementioned devices are examples and others may be used. According to an aspect, the computing device 1100 includes one or more communication connections 1116 allowing communications with other computing devices 1118. Examples of suitable communication connections 1116 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. According to an aspect, any such computer storage media is part of the computing device 1100. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, a tablet personal computer, a laptop computer, and the like, with which aspects may be practiced. With reference to FIG. 12A, an example of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. According to an aspect, the display 1205 of the mobile computing device 1200 functions as an input device (e.g., a touch screen display). If included, an optional side input element 1215 allows further user input. According to an aspect, the side input element 1215 is a rotary switch, a button, or any other type of manual input element. In alternative examples, mobile computing device 1200 incorporates more or less input elements. For example, the display 1205 may not be a touch screen in some examples. In alternative examples, the mobile computing device 1200 is a portable phone system, such as a cellular phone. According to an aspect, the mobile computing device 1200 includes an optional keypad 1235. According to an aspect, the optional keypad 1235 is a physical keypad. According to another aspect, the optional keypad 1235 is a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1200 incorporates peripheral device port 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 incorporates a system (i.e., an architecture) 1202 to implement some examples. In one example, the system 1202 is implemented as a "smart phone" capable of running one or more applications (e.g., browser, e-mail, calendaring, contact managers, messaging clients, games, and media clients/players). In some examples, the system 1202 is integrated as a computing device, such as an integrated personal digital assistant (PDA) and wireless phone.

According to an aspect, one or more application programs 1250 are loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. According to an aspect, the message classification and time-based relevancy prioritization system 110,121 is loaded into memory 1262. The system 1202 also includes a non-volatile storage area 1268 within the memory 1262. The non-volatile storage area 1268 is used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

According to an aspect, the system 1202 has a power supply 1270, which is implemented as one or more batteries. According to an aspect, the power supply 1270 further includes an external power source, such as an AC adapter or a powered docking cradle that supplements or recharges the batteries.

According to an aspect, the system 1202 includes a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

According to an aspect, the visual indicator 1220 is used to provide visual notifications and/or an audio interface 1274 is used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. According to an aspect, the system 1202 further includes a video interface 1276 that enables an operation of an on-board camera 1230 to record still images, video stream, and the like.

According to an aspect, a mobile computing device 1200 implementing the system 1202 has additional features or functionality. For example, the mobile computing device 1200 includes additional data storage devices (removable and/or non-removable) such as, magnetic disks, optical disks, or tape. Such additional storage is illustrated in FIG. 12B by the non-volatile storage area 1268.

According to an aspect, data/information generated or captured by the mobile computing device 1200 and stored via the system 1202 is stored locally on the mobile computing device 1200, as described above. According to another aspect, the data is stored on any number of storage media that is accessible by the device via the radio 1272 or via a wired connection between the mobile computing device 1200 and a separate computing device associated with the mobile computing device 1200, for example, a server computer in a distributed computing network, such as the Internet. As should be appreciated such data/information is accessible via the mobile computing device 1200 via the radio 1272 or via a distributed computing network. Similarly, according to an aspect, such data/information is readily transferred between computing devices for storage and use according to well-known data/information transfer and storage means, including electronic mail and collaborative data/information sharing systems.

FIG. 13 illustrates one example of the architecture of a system for providing automated classification and time-based relevancy prioritization of electronic messages as described above. Content developed, interacted with, or edited in association with the message classification and time-based relevancy prioritization system 110,121 is enabled to be stored in different communication channels or other storage types. For example, various documents may be stored using a directory service 1322, a web portal 1324, a mailbox service 1326, an instant messaging store 1328, or a social networking site 1330. The message classification and time-based relevancy prioritization system 110,121 is operative to use any of these types of systems or the like for providing automated classification and time-based relevancy prioritization of electronic messages, as described herein. According to an aspect, a server 1320 provides the message classification and time-based relevancy prioritization system 110,121 to clients 1305*a,b,c*. As one example, the server 1320 is a web server providing the message classification and time-based relevancy prioritization system 110,121 over the web. The server 1320 provides the message classification and time-based relevancy prioritization system 110,121 over the web to clients 1305 through a network 1340. By way of example, the client computing device is implemented and embodied in a personal computer 1305*a*, a tablet computing device 1305*b* or a mobile computing device 1305*c* (e.g., a smart phone), or other computing device. Any of these examples of the client computing device are operable to obtain content from the store 1316.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A device for classifying and prioritizing an electronic message, the device comprising:
   a processor; and
   a memory, operatively connected to the processor, storing instructions, which when executed, cause the processor to:
   receive an electronic message from a first user for delivering it to a second user;
   extract one or more objects from the electronic message;
   classify the electronic message to a message category based on the one or more objects;
   isolate objects comprising a time component from the one or more objects;
   determine time-sensitivity associated with the electronic message based on the time component of the objects;
   annotate, at a mail server, the electronic message with classification metadata defining the message category;
   annotate, at the mail server, the electronic message with time-sensitivity metadata defining the time-sensitivity; and
   provide the annotated electronic message to a mail client application associated with the second user.

2. The device of claim 1, wherein in classifying the electronic message to the message category based on the one or more objects, the instructions cause the processor to determine the message category related to the electronic message based on natural language processing of the one or more objects.

3. The device of claim 2, wherein the message category is selected from a group consisting of:
   a newsletter;
   an announcement;
   a travel-related message;
   an event-related message;
   a delivery notification;
   a payment notification;
   a bill;
   a financial statement;
   a promotional message; and
   a call-to-action message.

4. The device of claim 1, wherein in determining the time-sensitivity associated with the electronic message based on the time component of the objects, the instructions cause the processor to determine whether the electronic message is time-sensitive based on natural language processing of the time component of the objects.

5. The device of claim 4, wherein the instructions cause the processor to determine that the electronic message is time-sensitive based on time-related data comprising extracted dates and surrounding textual data or numeric data consistent with a pattern selected from a group consisting of:
   time-related word patterns; and
   time-related numeric patterns.

6. The device of claim 4, wherein the electronic message is determined to be relevant when the electronic message is time-sensitive and the time-related data extracted from the electronic message occurs prior to, on, or after a current date, or within a predetermined time period from the current date according to the message category; and wherein the instructions cause the processor to perform the action on the electronic message when the electronic message is determined to be relevant.

7. The device of claim 6, wherein the action includes at least one of the following:
   providing a visual indication of a prioritization of the electronic message based on the relevancy; and
   integrating with a calendaring application for adding a notification or calendaring event to a calendar associated with a receiving user of the electronic message.

8. The device of claim 4, wherein the electronic message is determined to be irrelevant when the electronic message is time-sensitive and the time-related data extracted from the electronic message occurs prior to, on, or after a current date, or within a predetermined time period from the current date according to the message category; and wherein the instructions cause the processor to perform the action on the electronic message when the electronic message is determined to be irrelevant.

9. The device of claim 8, wherein the action includes at least one of the following:
   archiving the electronic message;
   deleting the electronic message;
   filtering the electronic message from view;
   providing a visual indication in the user interface; and
   adding metadata to the electronic message indicating the determined irrelevance.

10. The device of claim 9, wherein performance of the action is based on settings or user-selected preferences.

11. The device of claim 1, wherein the instructions cause the processor to:
    filter electronic messages according to the relevancy;
    receive a selection of a relevance; and
    filter electronic messages according to the selected relevance, wherein the selected relevance includes at least one of the following:
    electronic messages that are relevant based on the time-sensitivity and the message category; and
    electronic messages that are irrelevant based on the time-sensitivity and the message category.

12. A computer-implemented method for classifying and prioritizing an electronic message, the method comprising:
    parsing the electronic message for identifying and extracting attributes, the electronic message being received from a first user for delivery to a second user;
    classifying the electronic message to a message category based on the extracted attributes;
    isolating at least one attribute comprising a time component from the extracted attributes;

identifying a time-sensitivity associated with the electronic message based on the time component of the at least one attribute;

annotating, at a mail server, the electronic message with classification metadata defining the message category;

annotating, at the mail server, the electronic message with time-sensitivity metadata defining the determined time-sensitivity; and providing the annotated electronic message to a mail client application associated with the second user.

13. The computer-implemented method of claim 12, wherein classifying the electronic message to the message category based on the one or more objects comprises determining the message category related to the electronic message based on natural language processing of the one or more objects.

14. The computer-implemented method of claim 12, wherein determining the time-sensitivity associated with the electronic message comprises determining whether the electronic message is time-sensitive based on natural language processing of the time component.

15. The computer-implemented method of claim 14, wherein determining whether the electronic message is time-sensitive comprises determining that the electronic message is time-sensitive based on a time-related data comprising extracted dates and surrounding textual data or numeric data consistent with a pattern selected from a group comprising:

time-related word patterns; and
time-related numeric patterns.

16. The computer-implemented method of claim 15, further comprising:

determining whether the electronic message is relevant or irrelevant based on whether the time-related data extracted from the electronic message occurs prior to, on, or after a current date, or within a predetermined time period from the current date according to the message category; and performing the action on the electronic message when the electronic message based on the determination of whether the electronic message is relevant or irrelevant.

17. The computer-implemented method of claim 16, wherein when the electronic message is determined to be relevant, performing the action on the electronic message when the electronic message based on the determination of whether the electronic message is relevant or irrelevant comprises at least one of the following:

providing a visual indication of a prioritization of the electronic message based on the electronic message's relevance; and integrating with a calendaring application for adding a notification or calendaring event to a calendar associated with a receiving user of the electronic message.

18. The computer-implemented method of claim 16, wherein when the electronic message is determined to be irrelevant, performing the action on the electronic message when the electronic message based on the determination of whether the electronic message is relevant or irrelevant comprises at least one of the following:

archiving the electronic message;
deleting the electronic message;
filtering the electronic message from view;
providing a visual indication in the user interface; and
adding metadata to the electronic message indicating the determined irrelevance.

19. The computer-implemented method of claim 12, further comprising:

receiving a selection of a relevance; and filtering electronic messages according to the selected relevance, wherein the selected relevance comprises at least one of the following:

electronic messages that are relevant based on the time-sensitivity and the message category; and electronic messages that are irrelevant based on the time-sensitivity and the message category.

20. A computer storage medium including instructions, which when executed by a computer, provides:

a server-side message classification and time-based relevancy prioritization system operative to:

receive an electronic message;

extract one or more objects from the electronic message;

classify the electronic message to a message category based on the one or more objects;

isolate objects comprising a time component from the one or more objects;

determine the time-sensitivity associated with the electronic message based on the time component of the objects;

annotate the electronic message with classification metadata identifying the message category; and annotate the electronic message with time-sensitivity metadata defining the determined time-sensitivity; and provide the annotated electronic message to a client-side message classification and time-based relevancy prioritization system.

* * * * *